March 21, 1950

W. ROWE ET AL 2,501,453

MICRO-PHOTOGRAPHIC PROJECTOR AND READER
DEVICE WITH INDEXING MEANS

Filed March 25, 1947

INVENTORS.
WALTER ROWE
CYRUS M. ADLER
BY
*Greene & Durr*
ATTORNEYS

March 21, 1950
W. ROWE ET AL
2,501,453
MICRO-PHOTOGRAPHIC PROJECTOR AND READER
DEVICE WITH INDEXING MEANS
Filed March 25, 1947
3 Sheets-Sheet 2
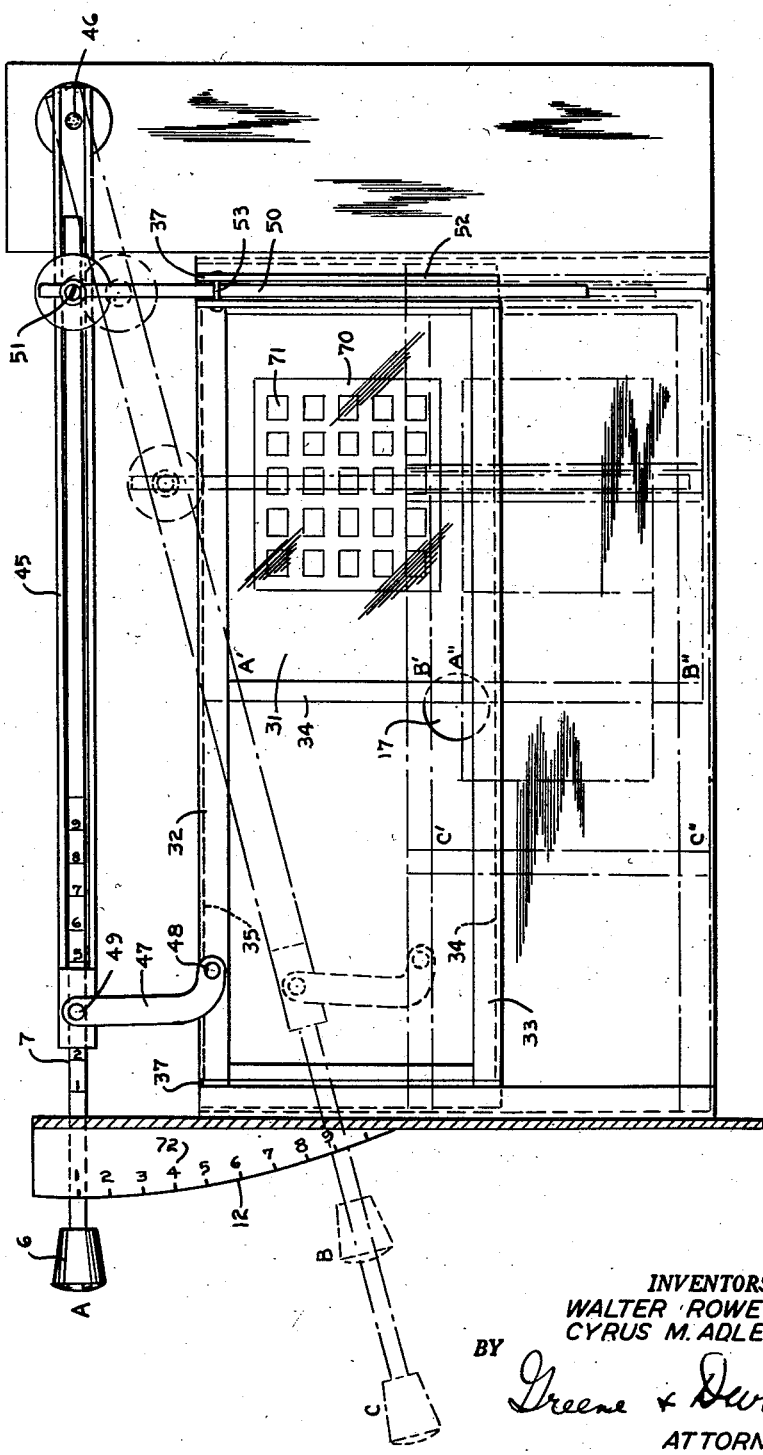
INVENTORS.
WALTER ROWE
CYRUS M. ADLER
BY
Greene & Durr
ATTORNEYS March 21, 1950  W. ROWE ET AL  2,501,453
MICRO-PHOTOGRAPHIC PROJECTOR AND READER
DEVICE WITH INDEXING MEANS
Filed March 25, 1947  3 Sheets-Sheet 3
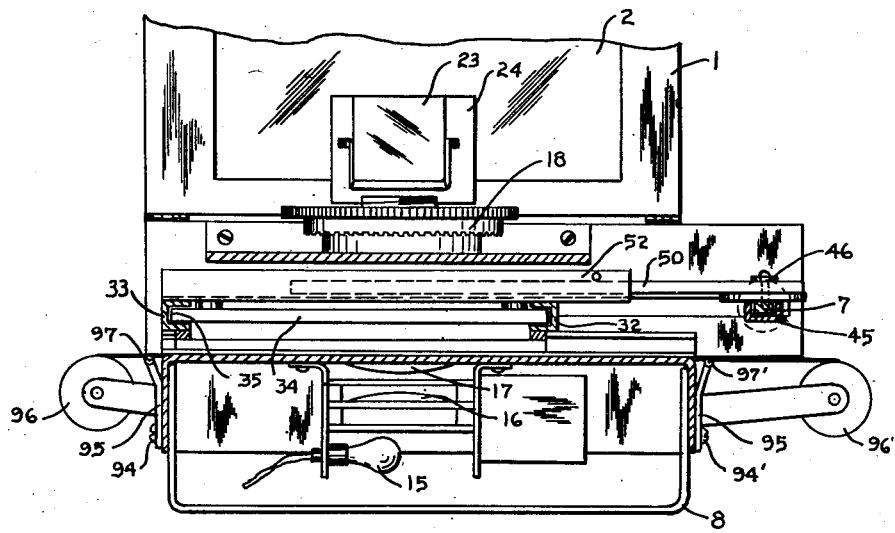
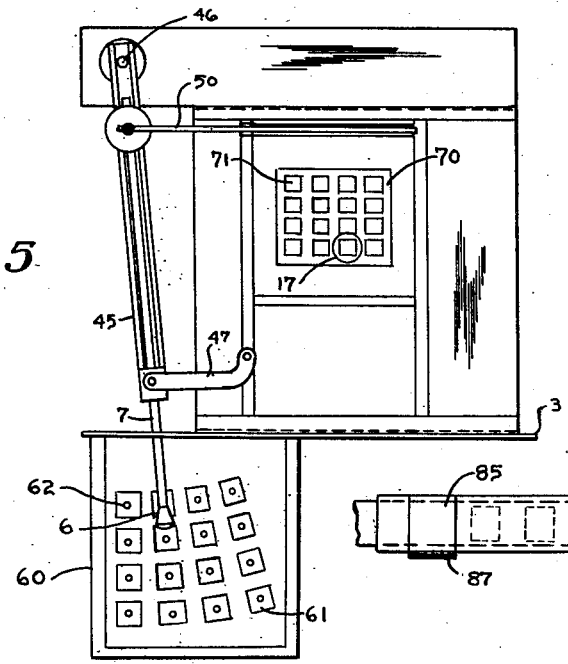
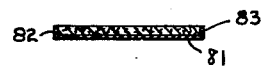
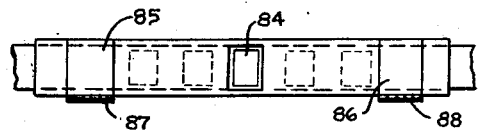
INVENTORS.
WALTER ROWE
CYRUS M. ADLER
BY
Greene & Durr
ATTORNEYS Patented Mar. 21, 1950

2,501,453

UNITED STATES PATENT OFFICE 2,501,453

MICROPHOTOGRAPHIC PROJECTOR AND READER DEVICE WITH INDEXING MEANS

Walter Rowe, New York, N. Y., and Cyrus M. Adler, Beverly Hills, Calif., assignors to Cinex, Inc., New York, N. Y., a corporation of New York Application March 25, 1947, Serial No. 736,956

8 Claims. (Cl. 88—24)

This invention relates to a reader of the projector type. More particularly it relates to a reader for reading microphotographic films.

An object of this invention is to provide a device for projecting micro-photographic images on a self-contained screen in which any one of a number of images from a flat film containing a plurality of images can be readily selected.

Another object of this invention is to provide a device for projecting micro-photographic images on a screen in which any one of a number of images from a flat film containing a plurality of images can readily be selected by manipulating a single operating or control mechanism.

Another object of the invention is to provide an indexing method in a micro-photographic reader by which any selected exposure can be projected on a screen regardless of the number of images on the film.

Another object of the invention is to provide a projecting type of reader for microphotographs which is adapted to project images from strip or roll films.

These objects and others ancillary thereto are obtained by providing a projector type of reader with a pair of parallel tracks on which a film holder is movable in one direction and a means to shift the parallel tracks in a second direction which is transversed with respect to the first direction. The tracks are located so as to position any portion of the film in a projecting position.

The novel features characteristic of this invention are set forth with particularity in the appended claims. The invention itself, however, both as to its organization and its method of operation, together with additional objects and advantages thereof, will best be understood from the following description of a specific embodiment when read in connection with the accompanying drawings in which:

Figure 1 is a front view of applicants' reader.

Figure 2 is a side view of the reader.

Figure 3 is a plan view of the film manipulating apparatus.

Figure 4 is a sectional view taken on line 4—4 of Figure 2.

Figure 5 is an alternative type of apparatus.

Figure 6 is a detailed view of a strip film inserting member.

Figure 7 is a cross-sectional view of Figure 6.

The appearance of the reader in use is illustrated in Figure 1. In general it comprises a front frame 1 containing a screen 2, a panel 3, a partially enclosed lighting chamber 4, and suitable supports 8. The panel 3 contains a rotatable button 5 for adjusting the lens of the projecting means. Below the button 5 is a slot 10 through which the film or film holding means is introduced. The left hand section of the panel 3 contains a shifting handle 6 which can be pulled out or moved from side to side in the slot 11. An arcuate flange 12 which contains suitable indicia is included in the panel 3. The screen 2 is preferably a ground glass plate and is removably attached to the frame 1 so that it can be replaced by a printing frame.

The optical system employed in the particular device shown here in best illustrated in Figures 2 and 4. Light is obtained from the lamp 15 and is passed through condensing lenses 16 and 17. The light then passes through the film to be projected and then through the lens contained in the lens holder 18. From the lens the light passes to a reflecting device which is shown in the drawing as a prism 23. The prism 23 is shown as adjustably supported upon a back 24 which is held at any desired angle by the arm 26 attached to the screw support 25, by the nut 28 and the spring 27. The lens in the holder 18 is adjustable for focusing by means of the button 5. The rod attached to the button 5 rotates the gear wheel 20 which registers with the geared rim 19 of the lens holder 18 and by rotation of the rim 19 the lens is raised or lowered to focus it. From the reflecting device 23 which may be the prism as shown or a mirror, the image is projected to the mirror 30. The ground glass screen 2 intercepts the image projected from the mirror 30. The top of the device may be shielded from outside light by the top 22 which preferably over hangs a portion of the screen. The side may also be shielded although no sides are shown in the drawing. The lens holder and the screw support 25 are both supported upon a floor 42 which is attached at the front end to the panel 3 and at the rear to sleeves 29 (only one shown in Figure 2).

The means for shifting the film containing the microphotographic images is illustrated in Figures 2, 3 and 4. The film is held in a film holder 31 which may be made from two sheets of glass. The film holder is adapted to be inserted into a frame 34 which is made to fit accurately about the film holder. The frame is slidable in the grooves 34 and 35 of the tracks 32 and 33. The length of the tracks 32 and 33 is approximately twice the length of the frame member 34 so that any portion of the frame 34 may be positioned above the lens shown at 17. The tracks 32 and 33 are held in parallel position by the frame 37 (see Figure 2). The frame 37 has projecting portions 40 and 41 which are adapted to slide in tracks 38 and 39 and are substantially perpendicular to the tracks 32 and 33.

For moving the film holder to any desired position the following mechanism has been provided. The rod 7 which is attached to the button 6 is slidably held in the channel of the channel member 45. The channel rod 45 is pivotally held at one end 46 and at the other end has a link 47 attached at 48 to the track 32. It can be seen therefore that lateral movement of the button 6 will move the frame 37 and the tracks 32, 33 laterally.

When the rod 7 is moved longitudinally with respect to the channel member the frame 34 is moved within the tracks 32 and 33 by the following means. A rod 50 is attached at 51 to the rod 7 but is not attached to the channel member 45. Another channel member 52 is attached to the frame 34 but is unattached to the tracks 32 and 33. The rod 50 is movable longitudinally with respect to the channel member 52.

Retraction of the rod from the position shown in Figure 3, for example, will cause the channel 52 and the attached frame 34 to move with respect to the tracks 32 and 33. The rod 50 is kept within the channel 52 by some such means as the bolt 53. Three positions of the button 6 and the film holder are illustrated in Figure 3 position A', A'' corresponds to position A of the button 6. Position B', B'' corresponds to the position B of the button 6 and position C', C'' corresponds to position C of the button 6. In Figure 3 the film 70 containing images 71 is also shown.

For inserting the film holder 31 into the frame 34 the button 6 is moved all the way to the right (as shown in Figure 1) and pulled all the way out. When this is done the frame 34 extends a short distance through the slot 10 and a film holder can be easily removed or inserted.

The flange 12 contains suitable indicia 72 by which any position of the tracks 32 and 33 may be identified. The rod 7 contains indicia along the length thereof by which any position of the frame 34 may be identified. Thus any image on the film 70 may be positioned by matching the proper number on the rod with the proper number on the flange 12. A series of removable flange plates bearing various indicia which corresponds to films with different numbers of rows of images may be provided. Various longitudinal sections of the rod may also contain different indicia for films with different numbers of horizontal rows.

The positioning device of this invention may be employed whether the sheet containing the plurality of images is a transparent film as shown, or whether it is an opaque sheet which is projected by reflected light. The individual sheets may be provided with indicia or be punched on the border or edge, for example, so that they may be sorted by suitable selecting means.

An alternative method for locating the desired image on the film 70 is shown diagrammatically in Figure 5. In this figure 60 is a tray adapted to hold an arcuately shaped card 61. Upon this card 61 are a plurality of indicia 62. Each one of these indicia identifies one particular exposure on the film 70. For each type of film 70 which is to be employed a separate card 61 is prepared so that regardless of the number of separate photographs 71 which appear on the film 71 any particular one can be located from the card 61.

The reader may be also provided with means for reading strip or roll film. A slot 90 may be provided in the side 91 of the reader (as shown in Figure 2) just below the frame 37, and buttons 93 and 94 are provided for attaching a slotted bracket 95, holding a reel. The bracket 95 also has a roller 97 thereon for aligning the film from the reel with the slot. A similar bracket 95' with reel 96' roller 97' is insertable in buttons on the other side of the reader (see Figure 4). A means may be provided in the panel 3 for rotating the reel 96' to move the film across the projecting position.

The roll film may be inserted in the slot which extends across the reader by first inserting it in a device such as shown in Figure 6. The device comprises an elongated member 81 having upturned sides 82 and 83 and containing a slot 84 at the center portion which coincides with the projecting position of the reader. Adjacent the ends of 84 are clamping members 85 and 86 which are hinged as shown at 87 and 88. The inside surfaces of 81, 85, 86 may be plush lined. The film can be easily inserted into the reader by first inserting it between members 81, 85 and 86 and then inserting this member in the slot 90.

Although certain specific embodiments of this invention have been shown and described, it will be understood, that many modifications thereof are possible. This invention, therefore, is not to be restricted except insofar as is necessitated by the prior art and by the spirit of the appended claims.

We claim:

1. In a reader or viewer of the projector type which has a projector position and an optical system for projecting upon a screen an image from a sheet which contains a plurality of images in a plurality of rows, the improvement which comprises a holder for supporting the image containing sheet, a frame adapted to surround and support the holder, a pair of parallel tracks adapted to hold the frame for movement in a direction parallel to the tracks, and a single shifting means having one handle and two sections, one of said sections being attached to and adapted to move the frame in the tracks and the other section being attached to and adapted to shift the tracks transversely whereby to move any selected one of the images of a sheet into the projection position of the reader.

2. In a reader or viewer of the projector type which has a projector position and an optical system for projecting upon a screen an image from a sheet which contains a plurality of images in a plurality of rows, the improvement which comprises a holder for supporting the image containing sheet, a frame adapted to surround and support the holder, a pair of parallel tracks adapted to hold the frame for movement in a direction parallel to the tracks, a second pair of tracks adapted to slidably support the first set of parallel tracks for transverse movement, and a single shifting means having one handle and two sections, one of said sections being attached to and adapted to move the frame in the first set of tracks and the other section being attached to and adapted to shift the first set of tracks along the second set of tracks whereby to move any selected one of the images of a sheet into the projection position of the reader.

3. In a reader or viewer of the projector type which has a projector position and an optical system for projecting upon a screen an image from a sheet which contains a plurality of images in a plurality of rows, the improvement which comprises a holder for supporting the image containing sheet, a frame adapted to surround and support the holder, a pair of parallel tracks adapted to hold the frame for movement in a direction parallel to the tracks, a second pair of tracks adapted to slidably support the first set of said parallel tracks for transverse movement, a telescoping pair of shafts, one of the telescoping pair being pivotally attached to the reader at one end and the other of said pair being movable away from the pivot point, means connecting one of said telescoping shafts to the movable frame, means connecting the other of said telescoping shafts to the first pair of parallel tracks whereby movement of the telescoping shafts with respect to each other causes movement of the movable member to which the unattached rod is connected and pivoting of the shafts causes movement of the other movable member to which the shafts are attached.

4. In a reader or viewer of the projector type which has a projector position, a screen, an optical system for projecting an image from a portion of a sheet which is located at the projection position and an operating panel adjacent the screen, the improvement which comprises a holder for supporting the image containing sheet, a frame adapted to surround and support the holder, a pair of parallel tracks adapted to hold the frame for movement in a direction parallel to the tracks, a second pair of tracks adapted to slidably support the first set of tracks for transverse movement, a telescoping pair of shafts, one of the telescoping pair being pivotally attached to the reader at one end and the other of said pair being movable away from the pivot point, means connecting one of said telescoping shafts to the movable frame, means connecting the other of said telescoping shafts to the first pair of parallel tracks the non-attached shaft extending through the operating panel, indicia on the non-attached shaft indicating its position relative to the pivotally attached shaft, a slot in said panel across which the extendable shaft moves in pivoting, means containing indicia associated with said slot to indicate the position of the parallel tracks in said reader.

5. In a reader or viewer of the projector type which has a projector position, a screen, an optical system for projecting an image from a portion of a sheet which is located at the projection position and an operating panel adjacent the screen, the improvement which comprises a holder for supporting the image containing sheet, a frame adapted to surround and support the holder, a pair of parallel tracks adapted to hold the frame for movement in a direction parallel to the tracks, a second pair of tracks adapted to slidably support the first set of tracks for transverse movement, a telescoping pair being pivotally attached to the reader at one end and the other of said pair being movable away from the pivot point, means connecting the other of said telescoping shafts to the first pair of parallel tracks the non-attached shaft extending through the operating panel, a slot in said panel across which the extendable shaft moves in pivoting, a removable means adapted to be attached adjacent said slot to indicate the position of the image which is in the projecting position.

6. In a reader or viewer of the projector type which has a projector position, a screen, an optical system for projecting an image from a portion of a sheet which is located at the projection position and an operating panel adjacent the screen, the improvement which comprises a holder for supporting the image containing sheet, a frame adapted to surround and support the holder, a pair of parallel tracks adapted to hold the frame for movement in a direction parallel to the tracks, a second pair of tracks adapted to slidably support the first pair of parallel tracks for transverse movement, a telescoping pair of shafts, one of the telescoping pair being pivotally attached to the reader at one end and the other of said pair being movable away from the pivot point, means connecting one of said telescoping shafts to the movable frame, means connecting the other of said telescoping shafts to the first pair of parallel tracks the non-attached shaft extending through the operating panel, a slot in said panel across which the extendable shaft moves in pivoting, a removable means adapted to be attached adjacent said slot having arcuately shaped rows of indicia to locate any particular image on said sheet.

7. In a reader or viewer of the projector type which has a projector position, a screen, an optical system for projecting an image from a portion of a sheet which is located at the projection position and an operating panel adjacent the screen, a holder for supporting the image containing sheet, a frame adapted to surround and support the holder, a pair of parallel tracks adapted to hold the frame for movement in a direction parallel to the tracks, a single shifting means having one handle and two sections, one of said sections being attached to and adapted to move the frame in the first set of tracks and the other section being attached to and adapted to shift the tracks in a transverse direction, the said handle extending through said panel and attached to one of said sections and adapted to control the movement of both of said sections and a slot in said panel into which the frame for the holder is adapted to be moved and through which the said holder can be removed and inserted.

8. In a reader or viewer of the projector type which has a projector position, a screen, an optical system for projecting an image from a portion of a sheet which is located at the projection position and an operating panel adjacent the screen, a holder for supporting the image containing sheet, a frame adapted to surround and support the holder, a pair of parallel tracks adapted to hold the frame for movement in a direction parallel to the tracks, a single shifting means adapted to move the frame in the first set of tracks and to shift the tracks in a transverse direction, a handle for said shifting means extending through a slot in said panel, a holding means attached to said panel adjacent the slot for the handle, an indicating means adapted to be held by said holding means by which any position of the sheet in the reader is indicated by the position of the handle with respect to the said indicating means.

WALTER ROWE.
CYRUS M. ADLER.

REFERENCES CITED

The following references are of record in the file of this patent:

UNITED STATES PATENTS

| Number | Name | Date |
|---|---|---|
| 1,129,693 | Kurre | Feb. 23, 1915 |
| 1,889,575 | Sebille | Nov. 29, 1932 |
| 1,977,475 | Feybusch | Oct. 16, 1934 |
| 2,008,982 | Hopkins | July 23, 1935 |
| 2,256,178 | Stuart | Sept. 16, 1941 |
| 2,260,551 | Boni et al. | Oct. 28, 1941 |
| 2,267,649 | Graves | Dec. 23, 1941 |
| 2,279,463 | Hopkins | Apr. 14, 1942 |
| 2,431,662 | Ralph | Nov. 25, 1947 |